UNITED STATES PATENT OFFICE.

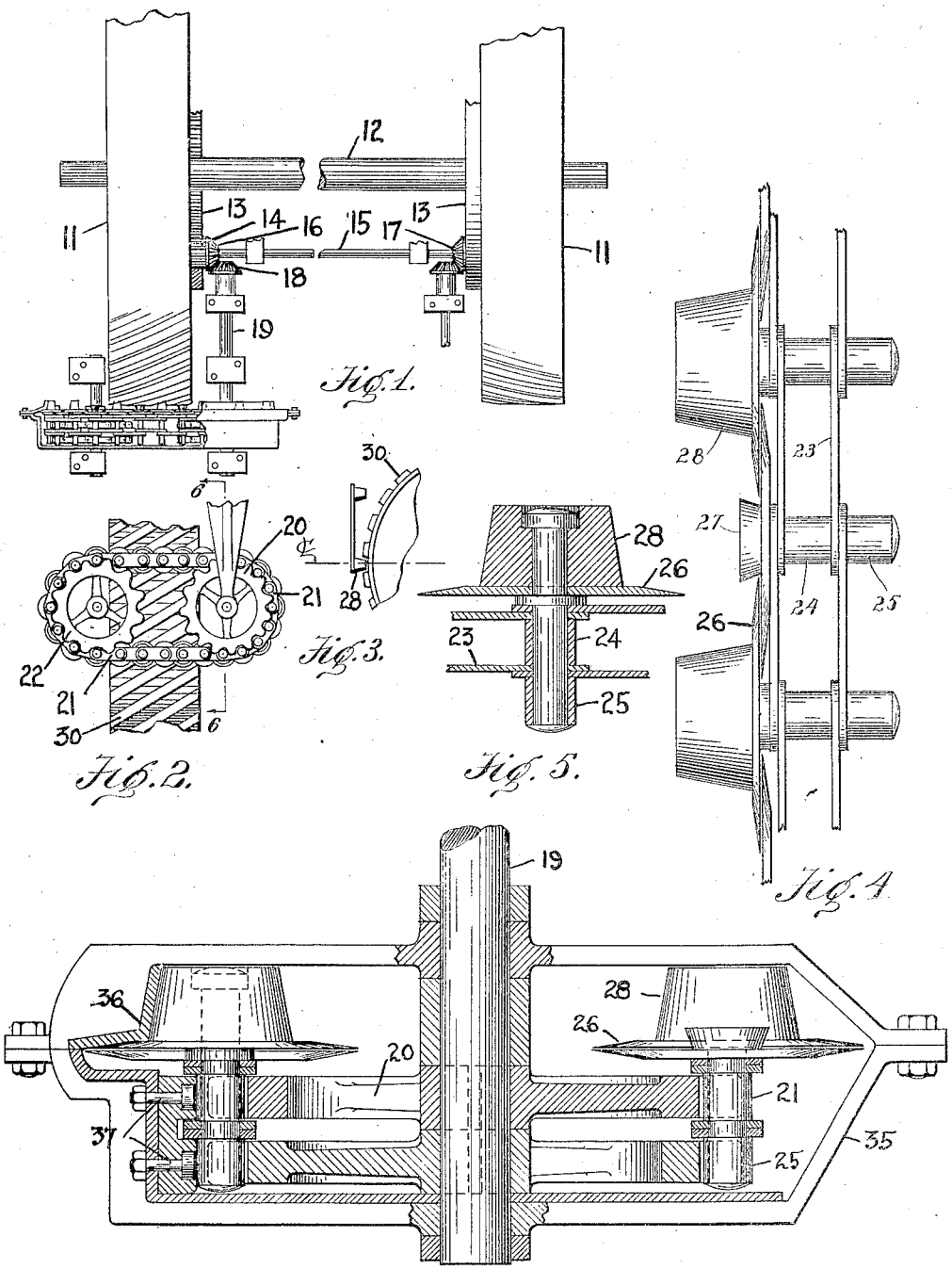

EMIL ERIK, OF OSSINNING, NEW YORK, ASSIGNOR, BY DIRECT AND MESNE ASSIGNMENTS, OF TWENTY PER CENT. TO ELROY I. QUICK, OF WESTCHESTER COUNTY, NEW YORK, AND THIRTY PER CENT. TO ALDEN W. HARVEY, OF NEW YORK, N. Y.

TRACTOR-SHOE-DIRT ELIMINATOR.

1,346,186.   Specification of Letters Patent.   Patented July 13, 1920.

Application filed February 11, 1920. Serial No. 357,869.

*To all whom it may concern:*

Be it known that I, EMIL ERIK, a citizen of the United States, residing at Ossinning, New York State, have invented a new and useful Improvement in Tractor-Shoe-Dirt Eliminators, of which the following is a specification.

This invention relates to devices for eliminating accumulations of dirt or mud on the shoes or anti-skidding devices on the traction wheels of tractors and the like. Dirt and mud ordinarily will accumulate or cake on the lugs or other such elements until their anti-skidding function is rendered ineffective. The object of this invention, then, is to keep the lugs clean and free of these accumulations.

The invention consists of means passing transversely or substantially horizontally across the rear of the traction wheels having rollers and disks adapted to co-act with the lugs to keep clean their sides and edges. This is preferably done by means of sprockets having chains taking therearound on which are provided rollers and disks so arranged as to fit or be complementary to the shape and inclination of the lugs. Various adjuncts for these are provided such as means for cleaning the rollers and disks, means for preventing lashing of the chains, means for preventing the dirt cleaned from the lugs falling into the cleaning mechanism, etc.

The best embodiment of my invention of which I am at present informed is illustrated in the accompanying drawings in which—

Figure 1 shows a plan view of the traction wheels of a vehicle with my attachment in place.

Fig. 2 is a side elevation of the attachment looking toward the rear of the wheel.

Fig. 3 shows the manner of locating the cleaning device with respect of the horizontal center through the wheel.

Fig. 4 shows details of construction of the cleaning chain, rollers and disks.

Fig. 5 shows one method of mounting the rollers on the chain.

Fig. 6 is a sectional view showing the chain, sprockets, rollers and disks in their casing. This view is taken along 6—6 in Fig. 2.

In the drawings, the numeral 11 indicates the traction or driving wheels of a farm or commercial vehicle, 12 the axle therefor, 13 the driven gear carried by each wheel, 14 a driven gear meshing with the gear 13. 15 indicates the driving shaft which is suitably supported, and has riding free on the ends thereof bevel gears 16 and 17 adapted to mesh with other bevel gears such as 18 on shaft 19 extending at right angles to driving shaft 15. Shaft 19 carries at its other end a sprocket 20 around which a chain 21 takes and which chain also takes around a second sprocket 22 on the outer side of the wheel 11.

The chain 21 has links 23 as shown in Fig. 4 connected by pins or studs 24 having a portion 25 extending beyond the links. These studs are preferably constructed as shown in Fig. 5 and carry at their ends, opposite 25, tapered disks 26 and tapered rollers 27 and 28. The disks on adjacent pins are oppositely directed and overlap as shown and alternate studs have rollers 28 thereon tapered to be complementary to the valleys or grooves formed between the diagonally extending lugs 30 on the wheels 11. Intermediate studs have heads 27 thereon tapered oppositely to the taper of the rollers 28.

Sprocket 20 (and likewise 22) is double in form to accommodate the studs 24 and their extensions 25 and in casing 35 which incloses them and chain 21, a shaped wall 36 is provided to scrape or clean the disks and rollers of any mud that clings to them. 37 represent adjusting means for overcoming lashing of chain 21.

Fig. 3 shows that I prefer to have the rollers and disks on the lower part of the chain do the cleaning of the lugs for then the dirt or mud as it is scraped off falls directly to the ground instead of into the cleaning devices and chain.

In operation, the vehicle moves forward and the lugs pick up dirt or mud from the ground. As the traction wheel moves forward, the dirty lug moves upwardly. At the same time the chain and its cleaning elements are driven at a speed commensurate with the speed of the machine so that as a lug moves upwardly across the path of movement of the chain and its cleaners, it is traversed by the cleaners, the rollers cleaning the sides of the lugs and the top of the wheel, and the disks cleaning the top or edge of the lug.

What I claim is:

1. In combination with traction wheels that require lugs for the purpose of non-skidding, means co-acting with the lugs to clean them having tapered rollers and disks.

2. The device of claim 1 in which the means have sprocket chains taking therearound, and rollers carried by said chains.

3. The device of claim 1 in which the means have sprocket chains taking therearound having links and double length pins, and rollers carried by said pins on one side of the chain.

4. The device of claim 1 in which the means have sprocket chains taking therearound having links and pins and a cutter carried by said pins on one side of the chain.

5. The device of claim 1 in which the means have sprockets, chains taking therearound having links and pins, disks on the pins, the disks on adjacent pins overlapping and having their abutting edges complementary.

6. In combination with the wheel having lugs thereon, a frame extending across the rear of the wheel, sprockets in said frame, a chain taking around said sprocket, means on said chain for cleaning the lugs, and means for driving said sprockets.

7. The device of claim 6 in which the plane of the frame is tangential to the periphery of the wheel and extends vertically from the point of tangency.

In testimony whereof I have signed my name to this specification this 3rd day of January, 1920.

EMIL ERIK.